US012626935B2

(12) United States Patent
Lee et al.

(10) Patent No.: US 12,626,935 B2
(45) Date of Patent: May 12, 2026

(54) RESIDUAL WATER DRAIN SYSTEM AND METHOD OF FUEL CELL VEHICLE

(71) Applicants: Hyundai Motor Company, Seoul (KR); Kia Corporation, Seoul (KR)

(72) Inventors: Dong Kwan Lee, Busan (KR); Seon Hak Kim, Yongin-si (KR); Seung Hwan Lee, Jeongeup-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 549 days.

(21) Appl. No.: 18/053,968

(22) Filed: Nov. 9, 2022

(65) Prior Publication Data

US 2023/0402628 A1      Dec. 14, 2023

(30) Foreign Application Priority Data

Jun. 9, 2022      (KR) ........................ 10-2022-0070036

(51) Int. Cl.
| | |
|---|---|
| *H01M 8/04119* | (2016.01) |
| *B60L 50/72* | (2019.01) |
| *H01M 8/04828* | (2016.01) |
| *H01M 16/00* | (2006.01) |

(52) U.S. Cl.
CPC ......... *H01M 8/04156* (2013.01); *B60L 50/72* (2019.02); *H01M 8/04828* (2013.01); *H01M 16/006* (2013.01); *H01M 2220/20* (2013.01); *H01M 2250/20* (2013.01)

(58) Field of Classification Search
CPC . H01M 16/006; H01M 2250/20; B60L 50/72; B60L 2240/62; B60L 2260/50; B60L 3/0053; B60L 50/75; B60L 58/12; B60L 58/40; B60L 50/70; B60L 58/30; Y02T 90/40
See application file for complete search history.

(56) References Cited

U.S. PATENT DOCUMENTS

| | | | | |
|---|---|---|---|---|
| 2016/0111736 A1* | 4/2016 | Matsubara | ........ | H01M 8/04492 429/414 |
| 2016/0141683 A1* | 5/2016 | Imanishi | ........... | H01M 8/04223 429/444 |
| 2022/0255100 A1* | 8/2022 | Vallur Rajendran | ........................ | H01M 8/04753 |

FOREIGN PATENT DOCUMENTS

KR      20180009004 A      1/2018

* cited by examiner

*Primary Examiner* — Adam A Arciero
(74) *Attorney, Agent, or Firm* — Slater Matsil, LLP

(57) ABSTRACT

An embodiment residual water drain system of a fuel cell vehicle includes a fuel cell, a drain device configured to drain residual water from the fuel cell, and a controller configured to drain the residual water from the fuel cell through the drain device, to turn off the fuel cell, and to convert a vehicle into an EV mode, when charging the vehicle with hydrogen is determined to be necessary.

20 Claims, 5 Drawing Sheets

FIG. 1

FIG.3 calculate estimated travel time — S210 estimated travel time > 1st reference time? — S220

Figure 3:
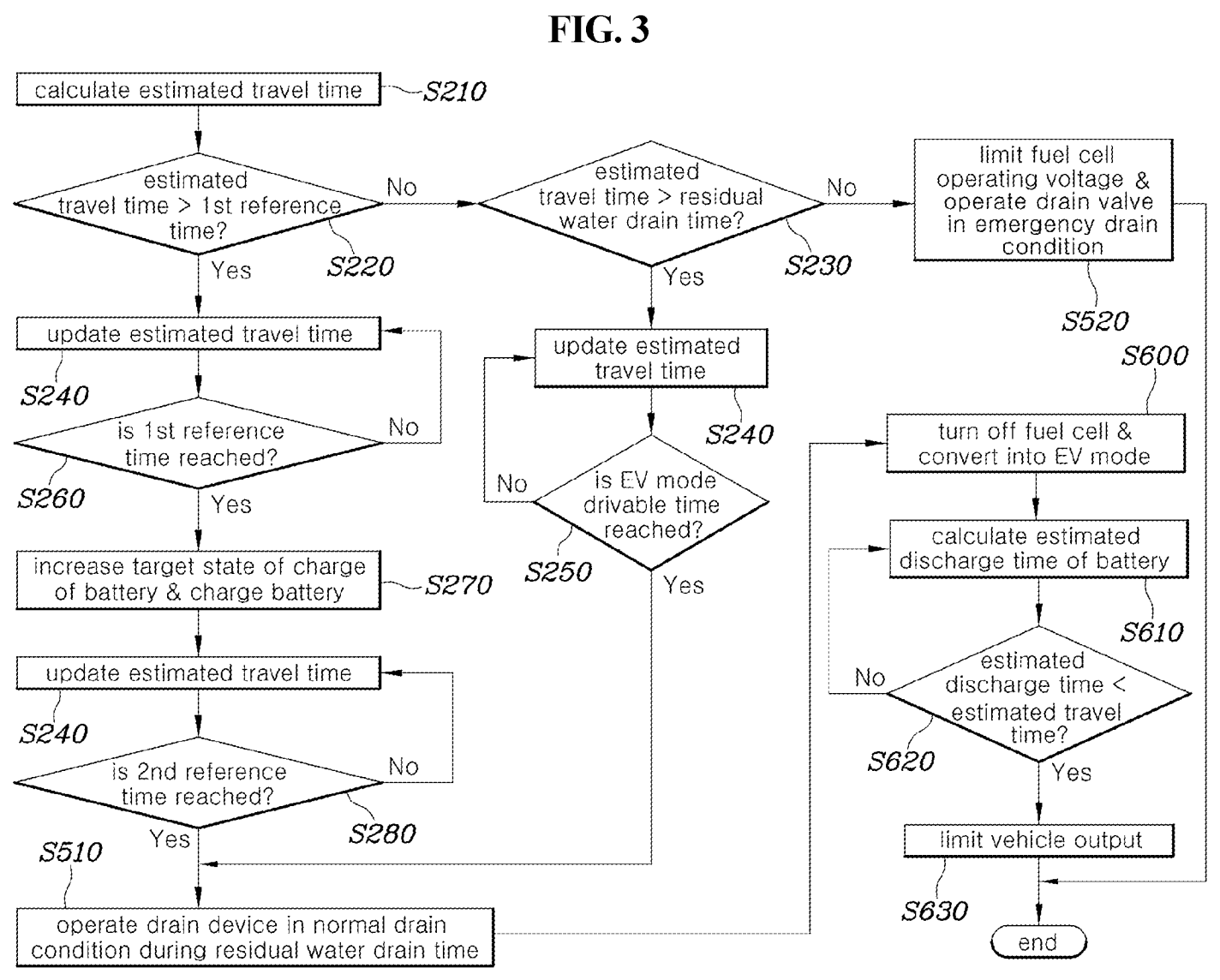

No → estimated travel time > residual water drain time? — S230

No → limit fuel cell operating voltage & operate drain valve in emergency drain condition — S520

Yes (S230) → update estimated travel time — S240 → is EV mode drivable time reached? — S250

No → turn off fuel cell & convert into EV mode — S600 calculate estimated discharge time of battery — S610 estimated discharge time < estimated travel time? — S620

Yes → limit vehicle output — S630 → end

No →

Yes (S220) → update estimated travel time — S240 → is 1st reference time reached? — S260

No →

Yes → increase target state of charge of battery & charge battery — S270 → update estimated travel time — S240 → is 2nd reference time reached? — S280

No →

Yes → operate drain device in normal drain condition during residual water drain time — S510

RESIDUAL WATER DRAIN SYSTEM AND METHOD OF FUEL CELL VEHICLE

CROSS-REFERENCE TO RELATED APPLICATIONS

This application claims the benefit of Korean Patent Application No. 10-2022-0070036, filed on Jun. 9, 2022, which application is hereby incorporated herein by reference.

TECHNICAL FIELD

The present disclosure relates generally to a residual water drain system and method of a fuel cell vehicle.

BACKGROUND

In general, fuel cells generate electric energy through a chemical reaction between hydrogen serving as a fuel and oxygen in the air. Such fuel cells are applied to a fuel cell vehicle and the like. The fuel cell vehicle is operated by driving an electric motor using electric energy generated by fuel cells. Here, fuel cells produce water through a chemical reaction between hydrogen and oxygen. There are problems in that the produced water reduces the active surface area of a catalyst surface of a fuel cell, thereby causing a loss in an electrode reaction, and causes a voltage drop by increasing the mass transfer coefficient, thereby reducing the performance of the fuel cell. In this regard, the fuel cell vehicle is provided with a function of frequently draining water produced during the operation of the vehicle.

However, even in the case in which produced water is frequently drained, a portion of the water may remain inside a fuel cell instead of being drained. In particular, in the winter, when the fuel cell vehicle is turned off, produced water (i.e., residual water) remaining inside the fuel cell may be frequently frozen. There are problems in that it is difficult to properly supply oxygen and hydrogen due to the freezing of residual water inside the fuel cell and the performance of the fuel cell may be reduced as a normal chemical reaction cannot be performed. Thus, in the winter, when the fuel cell vehicle turned off, residual water is drained and removed from inside the fuel cell by supplying a large amount of air to the load-free fuel cell for a predetermined time.

Meanwhile, when a fuel cell vehicle is short of hydrogen serving as a fuel, the fuel cell vehicle is charged with hydrogen at a hydrogen charging station. At the hydrogen charging station, the fuel cell vehicle short of hydrogen cannot be directly charged with hydrogen, and the fuel cell needs to be completely turned off to charge the vehicle with hydrogen. However, when the fuel cell is completely turned off in a low-temperature environment, residual water inside the fuel cell may be frozen, which is problematic. Thus, in the low-temperature environment, a process of draining residual water from inside the fuel cell is performed before the fuel cell is turned off. As the draining of the residual water from inside the fuel cell is completed and the fuel cell is turned off, the fuel cell vehicle can be charged with hydrogen. In the low-temperature environment, a time delay before the charging of hydrogen after the stopping of the vehicle is caused. Thus, affective quality of a user of the hydrogen charging station may be lowered, which is problematic. In addition, since the charging position of the fuel cell vehicle in the hydrogen charging station is fixed, the ground corresponding to the charging position may be frozen by repeatedly discharged residual water, which is problematic. Due to the freezing of the ground, when a fuel cell vehicle enters or exits the hydrogen charging station, a safety problem may occur.

The foregoing is intended merely to aid in the understanding of the background of the present disclosure, and is not intended to mean that the present disclosure falls within the purview of the related art that is already known to those skilled in the art.

SUMMARY

The present disclosure relates generally to a residual water drain system and method of a fuel cell vehicle. Particular embodiments relate to a residual water drain system and method of a fuel cell vehicle configured to, when charging a vehicle with hydrogen is determined to be necessary, drain residual water of a fuel cell through a drain device, turn off the fuel cell, and convert the vehicle into an electric vehicle (EV) mode, thereby preventing a time delay in the charging of hydrogen.

Accordingly, embodiments of the present disclosure keep in mind problems occurring in the related art, and embodiments of the present disclosure provide a residual water drain system of a fuel cell vehicle and method configured to, when charging a vehicle with hydrogen is determined to be necessary, drain residual water of a fuel cell through a drain device, turn off the fuel cell, and convert the vehicle into an EV mode, thereby preventing a time delay in the charging of hydrogen.

According to one embodiment of the present disclosure, there is provided a residual water drain system of a fuel cell vehicle, the system including a fuel cell, a drain device configured to drain residual water from the fuel cell, and a controller configured to drain residual water from the fuel cell through the drain device, to turn off the fuel cell, and to convert a vehicle into an EV mode, when charging the vehicle with hydrogen is determined to be necessary.

The drain device may be an air compressor connected to the fuel cell and configured to drain the residual water from the fuel cell by supplying air to the fuel cell.

The drain device may be an air compressor supplying air to the fuel cell. The controller may operate the drain device in a normal drain condition or an emergency drain condition, wherein the air compressor has a greater number of revolutions or a higher supply air flow rate when operating in the emergency drain condition than in the normal drain condition.

The residual water drain system may further include an information receiver receiving information from a navigation device. The controller may drain the residual water from the fuel cell by operating the drain device before the vehicle is charged with hydrogen using navigation information received from the information receiver.

When the navigation information is unavailable, the controller may operate the drain device in the normal drain condition during a residual water drain time and then may convert the vehicle into the EV mode, in response to a vehicle water drain request being input.

The residual water drain time may be a time taken for draining all of the residual water from the fuel cell by operating the drain device.

While the vehicle may be operating in the EV mode, the controller may periodically review state of charge of a battery and when the state of charge of the battery is lower than a minimum state of charge, the controller may end the EV mode and convert the vehicle into a fuel cell start mode.

The controller may review the destination of the vehicle when the navigation information is available and calculate an estimated travel time required to arrive at the hydrogen charging station when the destination of the vehicle is a hydrogen charging station.

The estimated travel time may be a time period required to arrive at the destination from a current position of the vehicle. The controller may update the estimated travel time according to the position of the vehicle.

When the initially calculated estimated travel time is shorter than the residual water drain time, the controller may limit the operating voltage of the fuel cell so as to not exceed a reference voltage and may operate the drain device in the emergency drain condition.

When the initially calculated estimated travel time is longer than the residual water drain time and shorter than a first reference time, the controller may update the estimated travel time. When the updated estimated travel time reaches the EV mode drivable time on the basis of the current state of charge of the battery of the vehicle, the controller may operate the drain device in the normal drain condition during the residual water drain time.

When the initially calculated estimated travel time is longer than the first reference time, the controller may update the estimated travel time. When the updated estimated travel time reaches the first reference time, the controller may charge the battery by increasing the target state of charge of the battery.

When the state of charge of the battery reaches the target state of charge, the controller may update the estimated travel time. When the updated estimated travel time reaches a second reference time shorter than the first reference time, the controller may operate the drain device in the normal drain condition during the residual water drain time.

While the vehicle is operating in the EV mode after the residual water is drained from the fuel cell, the controller may calculate an estimated discharge time on the basis of the state of charge of the battery. When the estimated discharge time is shorter than the updated estimated travel time, the controller may limit the output of the vehicle.

When the navigation information is available but the destination of the vehicle is not the hydrogen charging station, the controller may review whether or not there is a hydrogen charging station recorded as a visited place within a reference radius of the vehicle or on a travel route leading to the destination. When there is the hydrogen charging station recorded as the visited place, the controller may review whether or not a residual water drain preceding request is input.

When the residual water drain preceding request is input, the controller may calculate the estimated travel time required to arrive at the destination. When the estimated travel time reaches the first reference time, the controller may charge the battery by increasing the target state of charge of the battery.

According to another embodiment of the present disclosure, there is provided a residual water drain method of a fuel cell vehicle, the method including when a necessity to charge a vehicle with hydrogen is recognized, draining residual water from a fuel cell through a drain device by a controller before the charging of hydrogen, and when the draining of the residual water from the fuel cell is completed, turning off the fuel cell and converting the vehicle into an EV mode by the controller.

In the residual water drain system and method of a fuel cell vehicle according to embodiments of the present disclosure, since residual water is drained from the fuel cell before the vehicle enters the hydrogen charging station and the vehicle is converted into the EV mode by turning off the fuel cell, a standby time can be prevented from being delayed when the vehicle is charged with hydrogen after having entered the hydrogen charging station.

Since the residual water is drained from the fuel cell before the vehicle enters the hydrogen charging station, it is possible to prevent freezing in the ground due to the draining of the residual water at a single position of the hydrogen charging station in a low-temperature environment. It is also possible to improve the driving stability of the fuel cell vehicle.

BRIEF DESCRIPTION OF THE DRAWINGS

The above and other objectives, features, and other advantages of embodiments of the present disclosure will be more clearly understood from the following detailed description when taken in conjunction with the accompanying drawings, in which:

FIG. 1 is a schematic diagram illustrating the configuration of a residual water drain system of a fuel cell vehicle according to an embodiment of the present disclosure;

FIG. 3 is a detailed flowchart illustrating the residual water drain method of a fuel cell vehicle according to an embodiment of the present disclosure in a situation in which navigation information is available and the destination of a vehicle is a hydrogen charging station;

DETAILED DESCRIPTION OF ILLUSTRATIVE EMBODIMENTS

Figure 1:
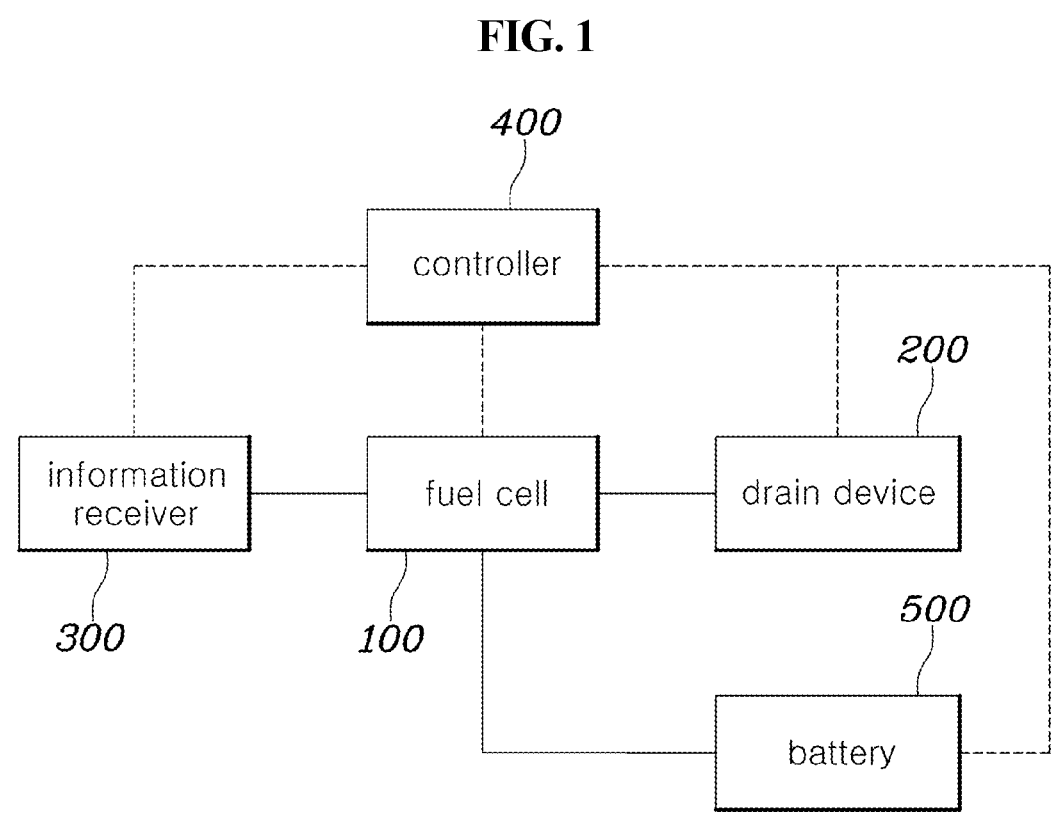
Figure 2:
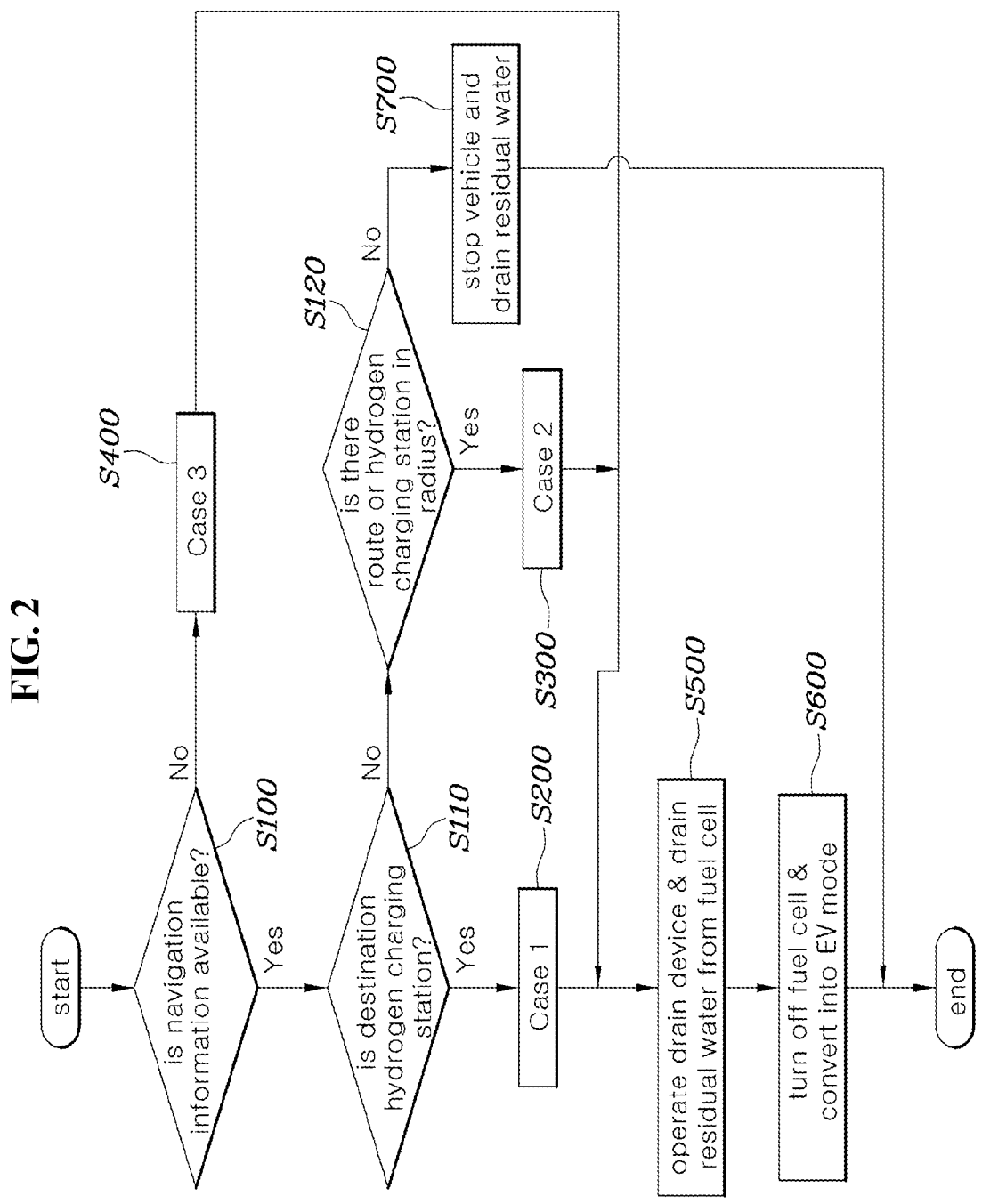
FIG. 2 is a flowchart illustrating a residual water drain method of a fuel cell vehicle according to an embodiment of the present disclosure.
Figure 4:
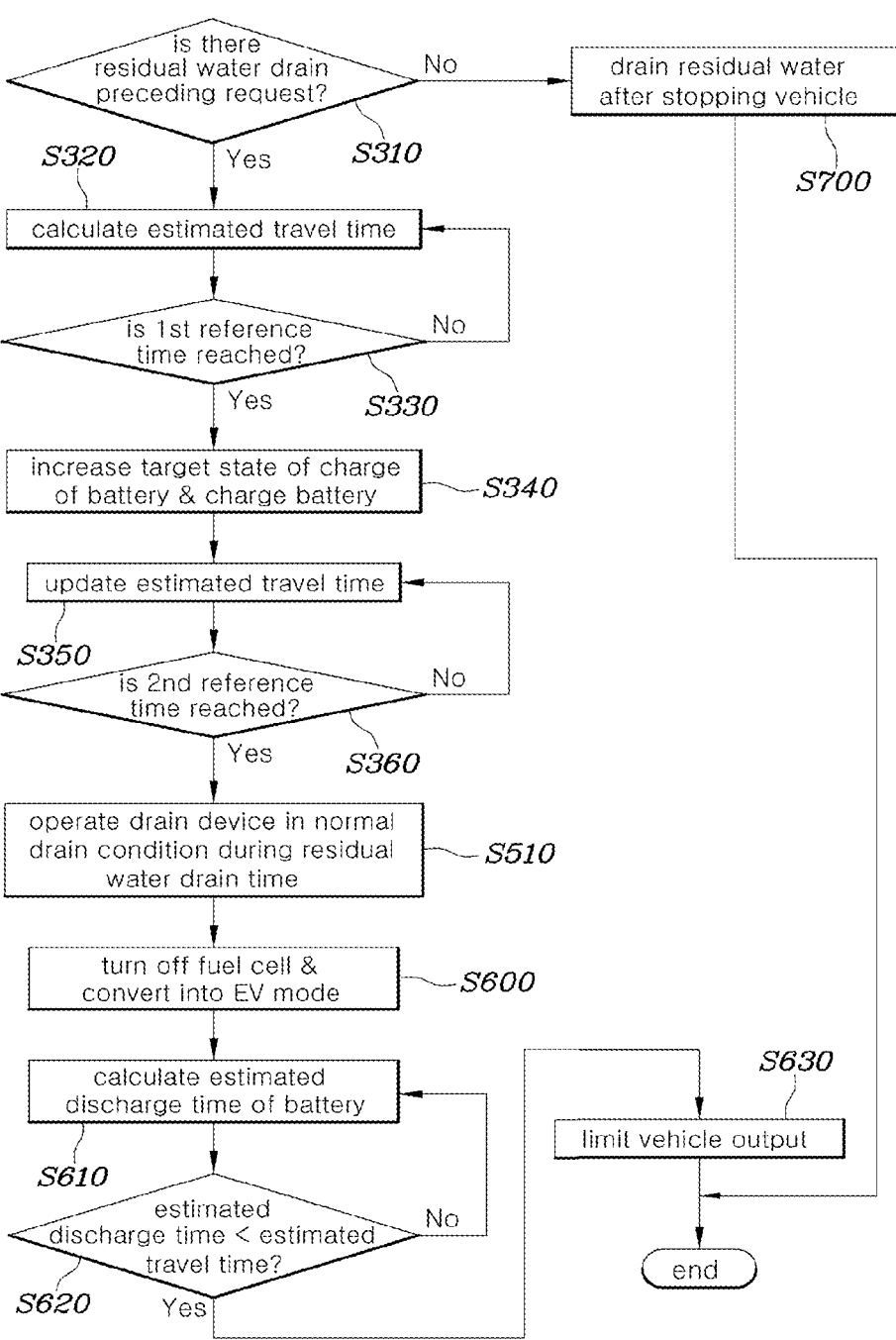
FIG. 4 is a detailed flowchart illustrating the residual water drain method of a fuel cell vehicle according to an embodiment of the present disclosure in a situation in which navigation information is available and the destination of a vehicle is not a hydrogen charging station.
Figure 5:
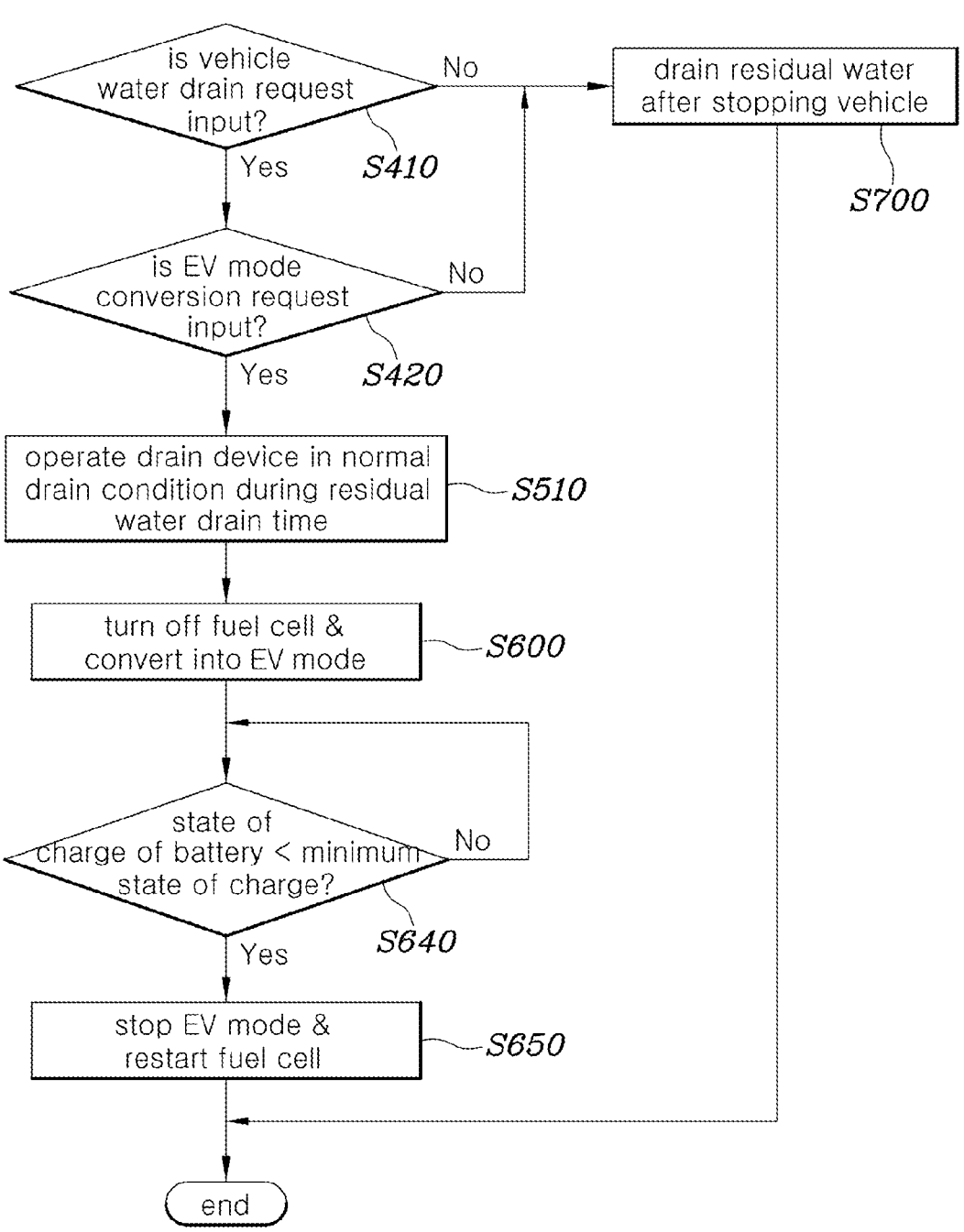
FIG. 5 is a detailed flowchart illustrating the residual water drain method of a fuel cell vehicle according to an embodiment of the present disclosure in a situation in which navigation information is unavailable.

FIG. 1 is a schematic diagram illustrating the configuration of a residual water drain system of a fuel cell vehicle according to an embodiment of the present disclosure, FIG. 2 is a flowchart illustrating a residual water drain method of a fuel cell vehicle according to an embodiment of the present disclosure, FIG. 3 is a detailed flowchart illustrating the residual water drain method of a fuel cell vehicle according to an embodiment of the present disclosure in a situation in which navigation information is available and the destination of a vehicle is a hydrogen charging station, FIG. 4 is a detailed flowchart illustrating the residual water drain method of a fuel cell vehicle according to an embodiment of the present disclosure in a situation in which navigation information is available and the destination of a vehicle is not a hydrogen charging station, and FIG. 5 is a detailed flowchart illustrating the residual water drain method of a fuel cell vehicle according to an embodiment of the present disclosure in a situation in which navigation information is unavailable.

In the description of embodiments of the present disclosure, when it is determined that the detailed description of the related aft would obscure the gist of the present disclosure, the detailed description thereof will be omitted. In addition, the attached drawings are merely intended to be able to readily understand the embodiments disclosed herein, and thus the technical idea disclosed herein is not limited by the attached drawings, and it should be understood to include all changes, equivalents, and substitutions included in the idea and technical scope of the present disclosure.

It will be understood that, although the terms "first", "second", etc., may be used herein to describe various elements, these elements should not be limited by these terms. These terms are only used to distinguish one element from another element.

It will be understood that when an element is referred to as being "coupled", "connected", or "linked" to another element, it can be directly coupled or connected to the other element or intervening elements may be present therebetween. In contrast, it should be understood that when an element is referred to as being "directly coupled", "directly connected", or "directly linked" to another element, there are no intervening elements present.

As used herein, a singular form is intended to include a plural form as well, unless the context clearly indicates otherwise.

It will be further understood that the terms "comprise", "include", "have", etc., when used in this specification, specify the presence of stated features, integers, steps, operations, elements, components, and/or combinations thereof but do not preclude the presence or addition of one or more other features, integers, steps, operations, elements, components, and/or combinations thereof.

Hereinafter, exemplary embodiments of the present disclosure will be described in detail with reference to the accompanying drawings. Throughout the drawings, the same reference numerals will refer to the same or like elements.

FIG. 1 is a schematic diagram illustrating the configuration of a residual water drain system of a fuel cell vehicle according to an embodiment of the present disclosure. The residual water drain system of a fuel cell vehicle according to embodiments of the present disclosure includes a fuel cell 100, a drain device 200 configured to drain residual water from inside the fuel cell 100, and a controller 400, wherein, when charging a vehicle with hydrogen is determined to be necessary, the controller 400 drains residual water from the fuel cell 100 through the drain device 200, turns off the fuel cell 100, and converts the vehicle into an electric vehicle (EV) mode.

The controller 400 according to an example embodiment of the present disclosure may be implemented using a non-volatile memory (not shown) and a processor (not shown). The non-volatile memory (not shown) is configured to store an algorithm configured to control operations of a variety of components of a vehicle or data regarding software instructions for regenerating the algorithm. The processor (not shown) is configured to perform operations to be described hereinafter using the data stored in the memory. Herein, the memory and the processor may be implemented as individual chips, respectively. Alternatively, the memory and the processor may be integrated into a single chip, and the processor may be one or more processors.

The fuel cell 100 provided in a fuel cell vehicle generates electric energy required to operate the vehicle and water by bringing hydrogen serving as a fuel and oxygen in the air into a reaction. Without hydrogen serving as the fuel, it is impossible to produce electric energy required to operate the vehicle. Thus, it is necessary to store hydrogen in the fuel cell vehicle. The stored hydrogen is supplied to the fuel cell 100 in response to a required output during the travel of the vehicle. However, when the stored hydrogen is completely consumed, the fuel cell wo cannot generate electric energy. Thus, it is necessary to charge the vehicle with hydrogen at a hydrogen charging station before the stored hydrogen is completely consumed.

In the charging of hydrogen at the hydrogen charging station, the fuel cell 100 should be completely turned off. However, in a low-temperature environment, a process of draining residual water in the fuel cell 100 is performed before the fuel cell 100 is turned off. Water is produced through the reaction between hydrogen and oxygen in the fuel cell 100. The produced water resides inside the fuel cell 100 or in a pipe connected to the fuel cell 100. When the fuel cell 100 is turned off in the low-temperature environment, the water residing inside the fuel cell wo or in the pipe connected to the fuel cell 100 may be frozen, which is problematic. Thus, in the low-temperature environment, the process of draining water residing in the fuel cell 100 is required before the operation of the fuel cell 100. When the vehicle enters the hydrogen charging station, even in the case in which the fuel cell 100 is turned off to charge the vehicle with hydrogen, the fuel cell 100 is not turned off before the draining of the residual water from inside the fuel cell is completed. Consequently, a standby time before the charging of hydrogen is increased, which is problematic.

In this regard, in embodiments of the present disclosure, when the necessity to charge the vehicle with hydrogen is recognized, the residual water is drained from the fuel cell wo through the drain device 200 before the charging of hydrogen. In this case, the drain device 200 includes an air compressor 200 connected to the fuel cell 100 and configured to drain the residual water from the fuel cell 100 by supplying air to the fuel cell 100. The drain device 200 includes the air compressor 200, a drain line, a drain valve, and the like as means for draining the residual water from the fuel cell 100. In embodiments of the present disclosure, the air compressor 200 of the drain device 200 configured to drain the residual water from the fuel cell wo by supplying air to the fuel cell 100 is supposed to be controlled. That is, controlling the drain device 200 by the controller 400 will be considered the same as controlling the air compressor 200 by the controller 400.

The drain device 200 is the air compressor 200 supplying air to the fuel cell 100, and the controller 400 operates the drain device 200 in a normal drain condition or an emergency drain condition. Here, during operation in the emergency drain condition, the number of revolutions of or the amount of air supplied to the air compressor 200 is increased to be greater than during operation in the normal drain condition. In an embodiment, the normal drain condition is determined such that the number of revolutions of the air compressor 200 is set as a first number of revolutions or the flow rate of air introduced through the air compressor 200 is set as a first supply air flow rate. In addition, the emergency drain condition is determined such that the number of revolutions of the air compressor 200 is set as a second number of revolutions or the flow rate of air introduced through the air compressor 200 is set as a second supply air flow rate. The second number of revolutions may be greater than the first number of revolutions, and the second supply air flow rate may be greater than the first supply air flow rate. By setting the emergency drain condition to be greater than the normal drain condition, the controller 400 may control the operation of the drain device 200 in accordance with a variety of situations when draining the residual water from the fuel cell 100.

Meanwhile, the residual water drain system of a fuel cell vehicle according to embodiments of the present disclosure further includes an information receiver 300 receiving information from a navigation device. The controller 400 drains the residual water from the fuel cell 100 by operating the drain device 200 before the charging of hydrogen using the navigation information received from the information receiver 300. The navigation device may be provided in the vehicle, be linked to a terminal of a driver, or be provided by a main server of the vehicle. The controller 400 operates the drain device 200 using information received from the information receiver 300 in order to drain the residual water from the fuel cell 100 before the charging of hydrogen.

However, when the navigation information is unavailable, in response to an input signal instructing the controller 400 to drain the residual water of the fuel cell 100, the controller 400 drains the residual water from the fuel cell 100 before the charging of hydrogen. Thus, when the navigation information is unavailable, the controller 400 operates the vehicle in the normal drain condition during a residual water drain time and then converts the vehicle into the EV mode, in response to a vehicle water drain request being input. In this case, the vehicle water drain request input to the controller 400 may be a drain signal transferred as the driver manually presses a water drain button provided in the vehicle, a driver's water drain voice request is recognized, or the residual water in the fuel cell 100 is above a reference level. Since the navigation information is unavailable, the controller 400 controls the residual water to be drained from the fuel cell 100 using the direct water drain request.

Here, the residual water drain time means a time taken for draining all of the residual water from the fuel cell 100 by operating the drain device 200. The residual water drain time is stored in the controller 400 as experimental data obtained through experiments performed in the low-temperature environment. Thus, when the vehicle water drain request is input, the controller 400 induces the stored residual water drain time. In addition, the controller 400 controls the drain device 200 to operate in the normal drain condition during the residual water drain time so as to drain the residual water from the fuel cell 100.

When the draining of the residual water from inside the fuel cell is completed, the controller 400 turns off the fuel cell 100 and converts the vehicle into the EV mode. While the vehicle is operating in the EV mode, the controller 400 periodically reviews the state of charge of a battery 500 during the travel of the vehicle. When the state of charge of the battery 500 is reduced to be lower than the minimum state of charge, the controller 400 ends the EV mode and converts the vehicle into a start mode of the fuel cell 100. Converting the vehicle into the EV mode and operating the vehicle in the EV mode indicates operating the vehicle by driving the motor using electricity stored in the battery 500 provided in the fuel cell vehicle. In this regard, the controller 400 is required to periodically review the state of charge of the battery 500. In addition, the minimum state of charge of the battery 500 indicates a minimum level of state of charge with which the battery 500 is not discharged. When the state of charge of the battery 500 is lower than the minimum state of charge, a problem of the discharged battery 500 occurs, thereby causing a problem in that it is impossible to operate the vehicle. Thus, the controller 400 is required to review the state of charge of the battery and, when the state of charge is lower than the minimum state of charge, end the EV mode and restart the fuel cell 100. In this manner, it is possible to obtain both the driving stability of the vehicle and the stability of the fuel cell system.

When the navigation information is available, the controller 400 controls the residual water to be drained from the fuel cell 100 before the charging of hydrogen, on the basis of the current position and the final destination of the vehicle. Thus, when the navigation information is available, the controller 400 reviews the destination of the vehicle. When the destination of the vehicle is a hydrogen charging station, the controller 400 calculates an estimated travel time required to arrive at the hydrogen charging station. The estimated travel time is a time period required to arrive at the destination from the current position of the vehicle. The controller 400 updates the estimated travel time according to the position of the vehicle. The controller 400 calculates the estimated travel time at the destination, i.e., the hydrogen charging station, on the basis of the position of the vehicle at a time point at which the navigation information is determined to be available. In addition, the controller 400 updates the estimated travel time at the destination on the basis of the position of the vehicle at various determination time points to be described later.

The controller 400 compares an initially calculated estimated travel time and the stored residual water drain time and has different driving conditions of the drain device 200 according to the result of the comparison when draining the residual water from the fuel cell wo. When the initially calculated estimated travel time is shorter than the residual water drain time, the controller 400 limits the operating voltage of the fuel cell 100 so as to not exceed a reference voltage and operates the drain device 200 in the emergency drain condition. The initially calculated estimated travel time shorter than the residual water drain time indicates that the draining of the residual water from inside the fuel cell 100 cannot be completed before arriving at the hydrogen charging station. In order to reduce the standby time taken for the vehicle to arrive at the hydrogen charging station and the fuel cell 100 to be turned off, it is necessary to drain the residual water from the fuel cell 100 as much as possible before the charging of hydrogen. Thus, the controller 400 operates the drain device 200 in the emergency drain condition. In this case, the drain device 200 is the air compressor 200 that operates at a higher number of revolutions or a higher supply air flow rate than in the normal drain condition.

In addition, the controller 400 inhibits additional generation of water in the fuel cell wo due to the introduction of air by limiting the operating voltage of the fuel cell 100 to not exceed the reference voltage. The controller 400 controls the voltage of the fuel cell 100 and operates the drain device 200 in the emergency drain condition, thereby draining a large amount of residual water from the fuel cell 100 before the charging of hydrogen and reducing the standby time at the hydrogen charging station.

Meanwhile, when the initially calculated estimated travel time is longer than the residual water drain time and shorter than a first reference time, the controller 400 updates the estimated travel time. In addition, when the updated estimated travel time reaches an EV mode drivable time on the basis of the current state of charge of the battery of the vehicle, the controller 400 operates the drain device 200 in the normal drain condition during the residual water drain time. The first reference time is also time data previously stored in the controller 400 like the residual water drain time. When the initially calculated estimated travel time is longer than the residual water drain time and shorter than the first reference time, the controller reviews the current position of the vehicle on the basis of a determination time point, and calculates and updates the estimated travel time.

In addition, the controller 400 reviews whether or not the updated estimated travel time reaches the EV mode drivable time on the basis of the current state of charge of the battery of the vehicle. When the updated estimated travel time reaches the EV mode drivable time, the controller 400 operates the drain device 200 in the normal drain condition during the residual water drain time. The controller 400 reviews the state of charge of the battery 500 of the vehicle and calculates the EV mode drivable time on the basis of the state of charge of the battery. When the updated estimated travel time reaches the calculated EV mode drivable time, the controller 400 operates the drain device 200 to drain the residual water from the fuel cell 100.

In addition, since there is a sufficient amount of time during which the residual water may be drained from the fuel cell 100 before arrival at the hydrogen charging station, i.e., the destination, the controller 400 is not required to operate the drain device 200 in the emergency drain condition. Thus, the controller 400 is not required to drain the residual water from the fuel cell 100 by operating the drain device 200 in the normal drain condition, the number of revolutions or the supply air flow rate of which is set to be lower than that of the emergency drain condition.

Meanwhile, when the initially calculated estimated travel time is longer than the first reference time, the controller 400 updates the estimated travel time. When the updated estimated travel time reaches the first reference time, the controller 400 charges the battery 500 by increasing the target state of charge of the battery 500. When the initially calculated estimated travel time is longer than the first reference time, the controller 400 reviews the position of the vehicle on the basis of the determination time point, and recalculates and updates the estimated travel time at the destination. When the updated estimated travel time reaches the first reference time, the controller 400 charges the battery 500 by increasing the target state of charge of the battery 500. The initially calculated estimated travel time being longer than the first reference time may indicate that a relatively long time is left before arrival at the destination, and that a time in which the vehicle is operated in the EV mode after the draining of the residual water from the fuel cell 100 is increased. The controller 400 may be required to increase the target state of charge of the battery 500 to reliably operate the vehicle in the EV mode after the residual water is drained from the fuel cell 100. As the target state of charge of the battery 500 is increased, electric energy generated by the fuel cell 100 is used to charge the battery 500.

When the state of charge of the battery reaches the target state of charge, the controller 400 updates the estimated travel time. When the updated estimated travel time reaches a second reference time shorter than the first reference time, the controller 400 operates the drain device 200 in the normal drain condition during the residual water drain time. When the state of charge of the battery reaches the increased target state of charge, the controller 400 recalculates and updates the estimated travel time on the basis of reaching a time point (at which the state of charge of the battery reaches the increased target state of charge). In addition, the controller 400 reviews whether or not the updated estimated travel time reaches the second reference time. The second reference time is a time shorter than the first reference time, and time data previously stored in the controller 400 like the first reference time. When the updated estimated travel time reaches the second reference time, the controller 400 drains the residual water from the fuel cell 100 by operating the drain device 200 in the normal drain condition during the residual water drain time.

The operations of the controller 400 repeatedly updating the estimated travel time and reviewing whether the updated estimated travel time has reached the first reference time and the second reference time are intended to reduce a time in which the vehicle operates in the EV mode after the draining of the residual water from inside the fuel cell is completed. When the draining of the residual water from inside the fuel cell is completed, the controller 400 turns off the fuel cell 100 and converts the vehicle into the EV mode. When the vehicle is converted into the EV mode, the motor is driven using power charged in the battery 500, and the EV mode drivable time is limited. Thus, when the estimated travel time at the destination is relatively long, the time for the draining of the residual water from the fuel cell 100 may be delayed, and the vehicle may be converted into the EV mode. Consequently, it is possible to stably operate the vehicle.

In addition, while the vehicle is converted into and operating in the EV mode after the residual water is drained from the fuel cell 100, the controller 400 calculates an estimated discharge time on the basis of the state of charge of the battery. When the estimated discharge time is shorter than the updated estimated travel time, the controller 400 limits the output of the vehicle. When the vehicle is converted into the EV mode, the motor is driven by consuming the power of the battery 500 provided in the vehicle. In the EV mode operation of the vehicle, the power of the battery 500 is continuously consumed. However, when the state of charge of the battery 500 is reduced to be equal to or lower than a discharge reference, the battery 500 is discharged, and the vehicle cannot operate, which is problematic. Thus, the controller 400 is configured to review the state of charge of the battery 500 and calculate the estimated discharge time on the basis of the state of charge of the battery.

In addition, the controller 400 needs to compare the updated estimated travel time and the estimated discharge time immediately before the draining of the residual water from the fuel cell 100 and, when the estimated discharge time is shorter than the updated estimated travel time, limit the output of the vehicle. The output of the vehicle is limited by limiting the maximum output of the motor in order to operate the vehicle in the EV mode before arriving at the destination. Consequently, the vehicle can travel in the EV mode to the destination, and the draining of the residual water from the fuel cell 100 can be completed before the charging of hydrogen, so that the vehicle can be charged with hydrogen without the standby time when arriving at the hydrogen charging station.

Meanwhile, when the navigation information is available but the destination of the vehicle is not the hydrogen charging station, the controller 400 reviews whether or not there is a hydrogen charging station recorded as a visited place within a reference radius of the vehicle or on a travel route leading to the destination. In addition, when there is the hydrogen charging station recorded as a visited place, the controller 400 reviews whether or not a residual water drain preceding request is input. When the navigation information is available but the destination of the vehicle is not the hydrogen charging station, it may be difficult to determine whether or not charging the vehicle with hydrogen is necessary. Thus, the controller 400 reviews whether or not there is the hydrogen charging station recorded as a visited place within the reference radius of the vehicle or on the travel route leading to the destination.

When there is the hydrogen charging station recorded as a visited place, the controller 400 reviews whether or not the residual water drain preceding request is input. The residual water drain preceding request may be input by the driver or by the system when it is necessary to drain the residual water. Consequently, the controller 400 determines whether or not to drain the residual water from the fuel cell 100 before the charging of hydrogen by reviewing whether or not the residual water drain preceding request is input.

When the residual water drain preceding request is input, the controller 400 calculates the estimated travel time required to arrive at the destination. When the estimated travel time reaches the first reference time, the controller 400 charges the battery 500 by increasing the target state of charge of the battery 500. When the residual water drain preceding request is input, the controller 400 calculates the estimated travel time required to arrive at the destination on the basis of the time point at which the request is input. When the estimated travel time calculated in this manner reaches the first reference time, the controller 400 charges the battery 500 by increasing the target state of charge of the battery 500. When the battery 500 is completely charged, the controller 400 updates the estimated travel time by determining the position of the vehicle at a time point at which the charging is completed, and reviews whether or not the updated estimated travel time reaches the second reference time. When the updated estimated travel time reaches the second reference time shorter than the first reference time, the controller 400 operates the drain device 200 in the normal drain condition during the residual water drain time to drain the residual water from the fuel cell 100.

When the draining of the residual water is completed, the controller 400 turns off the fuel cell 100 and converts the vehicle into the EV mode. During the operation of the vehicle in the EV mode, the controller 400 calculates the estimated discharge time on the basis of the state of charge of the battery. When the calculated estimated discharge time is shorter than the updated estimated travel time, the controller 400 limits the maximum output of the motor and operates the vehicle in the EV mode.

FIGS. 2 to 5 are flowcharts illustrating a residual water drain method of a fuel cell vehicle depending on whether or not navigation information is available according to an embodiment of the present disclosure. FIG. 2 is a flowchart illustrating a residual water drain method of a fuel cell vehicle according to an embodiment of the present disclosure. The residual water drain method of a fuel cell vehicle according to an embodiment of the present disclosure includes, when the necessity to charge the vehicle with hydrogen is recognized, draining residual water from the fuel cell 100 through the drain device 200 by the controller 400 before the charging of hydrogen in S500, and when the draining of the residual water from the fuel cell 100 is completed, turning off the fuel cell 100 and converting the vehicle into the EV mode by the controller 400 in S600.

When the necessity to charge the vehicle with hydrogen is recognized, the controller 400 determines whether or not the navigation information is available through the information receiver 300 in order to drain the residual water of the fuel cell 100 through the drain device 200 before the charging of hydrogen in S100. Depending on whether or not the navigation information is available and whether or not the destination is the hydrogen charging station in S200, S300, and S400, the residual water is drained from the fuel cell 100 through the drain device 200 in S500.

FIG. 3 is a detailed flowchart illustrating the residual water drain method of a fuel cell vehicle according to an embodiment of the present disclosure in a situation in which the navigation information is available and the destination of the vehicle is the hydrogen charging station. Specifically, referring to FIGS. 2 and 3, when the navigation information is available through the information receiver 300, the controller 400 reviews whether or not the destination is the hydrogen charging station in S110. When the destination of the vehicle is the hydrogen charging station, the controller 400 calculates the estimated travel time required to arrive at the hydrogen charging station, i.e., the destination, on the basis of the current position of the vehicle in S210. When the estimated travel time is calculated, the controller 400 compares the previously stored residual water drain time and the previously stored first reference time with the initially calculated estimated travel time in S220 and S230. The initially calculated estimated travel time is compared with the residual water drain time in S230. When the estimated travel time is shorter than the residual water drain time, the controller 400 operates the drain device 200 in the emergency drain condition in S520. In addition, the operating voltage of the fuel cell 100 is limited so as to not exceed the reference voltage in order to inhibit additional production of water in the fuel cell 100.

The controller 400 operates the drain device 200 in the emergency drain condition to drain the residual water from the fuel cell 100 before the charging of hydrogen. This indicates that the entire residual water in the fuel cell 100 is not drained before the charging of hydrogen and a portion of the residual water in the fuel cell 100 is drained before the vehicle arrives at the hydrogen charging station, i.e., the destination. As a portion of the residual water in the fuel cell 100 is drained in the emergency drain condition, after the arrival at the hydrogen charging station and before the charging of hydrogen, the standby time due to the draining of the residual water from the fuel cell 100 may be reduced.

When the initially calculated estimated travel time is longer than the residual water drain time and shorter than the first reference time, the controller reviews the position of the vehicle on the basis of a time point of time comparison and determination and recalculates and updates the estimated travel time in S230 and S240. The controller 400 reviews whether or not the updated estimated travel time reaches the EV mode drivable time on the basis of the state of charge of the battery of the vehicle in S250. When the estimated travel time reaches the EV mode drivable time, the controller 400 operates the drain device 200 in the normal drain condition during the residual water drain time to drain the residual water from the fuel cell 100 in S510. When the draining of the residual water from the fuel cell 100 is completed, the controller 400 turns off the fuel cell 100 and converts the vehicle into the EV mode in S600. While the vehicle is operating in the EV mode, the controller 400 reviews the state of charge of the battery of the vehicle and calculates the estimated discharge time of the battery 500 in S610. Since the vehicle operated in the EV mode consumes the power of the battery 500, it is necessary to operate the vehicle by reviewing the state of charge of the battery 500.

Thus, the controller 400 compares the calculated estimated discharge time and the updated estimated travel time in S620, and, when the estimated discharge time is shorter than the updated estimated travel time, limits the output of the vehicle in S630. When the estimated travel time is longer than the estimated discharge time, the battery 500 of the vehicle may be discharged before arrival at the destination. Accordingly, the controller 400 needs to limit the output of the vehicle in order to prevent the battery 500 from being discharged.

Meanwhile, when the initially calculated estimated travel time is longer than the first reference time, the controller 400 reviews the position of the vehicle on the basis of the time point of time comparison and determination and recalculates and updates the estimated travel time in S240. The controller 400 reviews whether or not the updated estimated travel time reaches the first reference time in S260. When the estimated travel time reaches the first reference time, the controller 400 increases the target state of charge of the battery 500 and charges the battery 500 in order to fill the insufficient state of charge of the battery in S270. When the charging of the battery 500 with hydrogen is completed, the controller 400 reviews the position of the vehicle on the basis of a charge complete time point and recalculates and updates the estimated travel time in S240. The controller 400 reviews whether or not the updated estimated travel time reaches the second reference time shorter than the first reference time in S280. When the updated estimated travel time reaches the second reference time, the controller 400 operates the drain device 200 in the normal drain condition during the residual water drain time to drain the residual water from the fuel cell 100 in S510. When the draining of the residual water from the fuel cell 100 is completed, the controller 400 turns off the fuel cell 100 and converts the vehicle into the EV mode in S600. While the vehicle is operating in the EV mode, the controller 400 reviews the state of charge of the battery and calculates the estimated discharge time of the battery 500 in S610. The estimated discharge time and the updated estimated travel time are compared in S620. When the estimated discharge time is shorter than the estimated travel time, the controller 400 limits the output of the vehicle in S630.

FIG. 4 is a detailed flowchart illustrating the residual water drain method of a fuel cell vehicle according to an embodiment of the present disclosure in a situation in which the navigation information is available and the destination of the vehicle is not the hydrogen charging station. Referring to FIGS. 2 to 4, when the controller 400 may use the navigation information through the information receiver 300 but the destination of the vehicle is not the hydrogen charging station, the controller 400 reviews whether or not there is a hydrogen charging station recorded as a visited place within a reference radius of the vehicle or on a travel route leading to the destination in S120. When there is no hydrogen charging station recorded as a visited place within the reference radius of the vehicle or on the travel route leading to the destination, after the vehicle arrives at the destination or a new hydrogen charging station and is stopped, the controller 400 drains the residual water from the fuel cell 100 in S700. In contrast, when there is the hydrogen charging station recorded as a visited place within the reference radius of the vehicle or on the travel route leading to the destination, the controller 400 reviews whether or not a residual water drain preceding request is input in S319. The residual water drain preceding request may be input by the driver or by the system when it is necessary to drain the residual water. When the residual water drain preceding request is not input, after the vehicle is stopped, the controller 400 controls the residual water to be drained from the fuel cell 100 in S700.

When the residual water drain preceding request is input, the controller 400 reviews the position of the vehicle on the basis of the request input time point and calculates the estimated travel time required to arrive at the hydrogen charging station in S320. In addition, the controller 400 reviews whether or not the estimated travel time calculated in this manner reaches the first reference time in S330. When the estimated travel time reaches the first reference time, the controller 400 increases the target state of charge of the battery 500 and charges the battery 500 according to the increased target state of charge in S340. When the charging of the battery 500 with hydrogen is completed, the controller 400 reviews the position of the vehicle on the basis of the charge complete time point and calculates and updates the estimated travel time in S350. In addition, the controller 400 reviews whether or not the updated estimated travel time reaches the second reference time shorter than the first reference time in S360. When the updated estimated travel time reaches the second reference time, the controller 400 operates the drain device 200 in the normal drain condition during the residual water drain time to drain the residual water from the fuel cell 100 in S510. When the draining of the residual water from the fuel cell 100 is completed, the controller 400 turns off the fuel cell 100 and converts the vehicle into the EV mode in S600. While the vehicle is operating in the EV mode, the controller 400 reviews the state of charge of the battery of the vehicle and calculates the estimated discharge time of the battery 500. The calculated estimated discharge time is compared with the updated estimated travel time in S620. When the calculated estimated discharge time is shorter than the updated estimated travel time, the controller 400 limits the output of the vehicle in S630.

FIG. 5 is a detailed flowchart illustrating the residual water drain method of a fuel cell vehicle according to an embodiment of the present disclosure in a situation in which the navigation information is unavailable.

When the controller 400 cannot use the navigation information through the information receiver 300, the controller 400 reviews whether or not the vehicle water drain request is input in S410. The vehicle water drain request may be input by the driver manually pressing a water drain button provided in the vehicle or by the system determining that it is necessary to drain water. However, when the vehicle water drain request is not input, the controller 400 controls the residual water to be drained from the fuel cell 100 after the vehicle is stopped.

When the vehicle water drain request is input, the controller 400 reviews whether or not an EV mode conversion request is input in S420. The EV mode conversion request may be input on the basis of the determination of the driver when the driver is notified of the EV mode drivable time estimated on the basis of the current state of charge of the battery. When the EV mode conversion request is not input, the controller 400 controls the residual water to be drained from the fuel cell 100 after the vehicle is stopped in S700. When the EV mode conversion request is input, the controller 400 operates the drain device 200 in the normal drain condition during the residual water drain time to drain the residual water from the fuel cell 100 in S510. After the draining of the residual water from the fuel cell 100 is completed, the controller 400 turns off the fuel cell 100 and converts the vehicle into the EV mode in Shoo.

While the vehicle is operating in the EV mode, the estimated discharge time may be calculated by reviewing the state of charge of the battery 500. However, when the navigation information is unavailable, it is difficult to measure a time required to arrive at the destination. Thus, it may be difficult to perform the time calculation and comparison as in the above-described process. In this regard, the controller 400 reviews the state of charge of the battery 500 and compares the state of charge of the battery 500, reviewed during the travel, with the minimum state of charge at which the battery 500 is discharged in S640. When the state of charge of the battery 500 is lower than the minimum state of charge, the battery 500 is discharged when the vehicle is continuously operated in the EV mode. In this regard, when the state of charge of the battery 500 is lower than the minimum state of charge, the controller 400 stops the EV mode of the vehicle and restarts the fuel cell 100 in S650. In this manner, when the vehicle is operating in the EV mode, it is possible to obtain both the driving stability of the vehicle and the stability of the fuel cell system.

In the residual water drain system and method of a fuel cell vehicle according to embodiments of the present disclosure, since residual water is drained from the fuel cell before the vehicle enters the hydrogen charging station and the vehicle is converted into the EV mode by turning off the fuel cell, a standby time can be prevented from being delayed when the vehicle is charged with hydrogen after having entered the hydrogen charging station.

Since the residual water is drained from the fuel cell before the vehicle enters the hydrogen charging station, it is possible to prevent freezing in the ground due to the draining of the residual water at a single position of the hydrogen charging station in a low-temperature environment. It is also possible to improve the driving stability of the fuel cell vehicle.

Although the exemplary embodiments of the present disclosure have been described for illustrative purposes, those skilled in the art will appreciate that various modifications, additions, and substitutions are possible, without departing from the scope and spirit of the present disclosure as disclosed in the accompanying claims.

What is claimed is:

1. A residual water drain system of a fuel cell vehicle, the system comprising:
a fuel cell;
a drain device configured to drain residual water from the fuel cell; and
a controller programmed to:
determine that charging the vehicle with hydrogen is necessary;
cause the residual water to be drained from the fuel cell through the drain device and turn off the fuel cell in response to charging the vehicle with hydrogen being determined to be necessary; and
convert the fuel cell vehicle into an EV mode in response to the residual water being drained from the fuel cell and the fuel cell being turned off.

2. The system of claim 1, wherein the drain device comprises an air compressor connected to the fuel cell and configured to drain the residual water from the fuel cell by supplying air to the fuel cell.

3. The system of claim 1, wherein:
the drain device comprises an air compressor configured to supply air to the fuel cell; and
the controller is programmed to operate the drain device in a normal drain condition or an emergency drain condition, wherein the air compressor has a greater number of revolutions or a higher supply air flow rate when operating in the emergency drain condition than when operating in the normal drain condition.

4. The system of claim 3, further comprising an information receiver configured to receive information from a navigation device, wherein the controller is programmed to drain the residual water from the fuel cell by operating the drain device before the vehicle is charged with hydrogen using navigation information received from the information receiver.

5. The system of claim 4, wherein, when the navigation information is unavailable, the controller is programmed to operate the drain device in the normal drain condition during a residual water drain time and then convert the vehicle into the EV mode, in response to a vehicle water drain request being input.

6. The system of claim 5, wherein the residual water drain time is a time taken for draining all of the residual water from the fuel cell by operating the drain device.

7. The system of claim 5, wherein, while the vehicle is operating in the EV mode, the controller is programmed to periodically review a state of charge of a battery and, when the state of charge of the battery is lower than a minimum state of charge, the controller is programmed to end the EV mode and convert the vehicle into a fuel cell start mode.

8. The system of claim 4, wherein the controller is programmed to review a destination of the vehicle when the navigation information is available and calculate an estimated travel time required to arrive at a hydrogen charging station when the destination of the vehicle is the hydrogen charging station.

9. The system of claim 8, wherein:
the estimated travel time is a time period required to arrive at the destination from a current position of the vehicle; and
the controller is programmed to update the estimated travel time according to the current position of the vehicle.

10. The system of claim 8, wherein, when the estimated travel time is shorter than a residual water drain time, the controller is programmed to limit an operating voltage of the fuel cell so as to not exceed a reference voltage and to operate the drain device in the emergency drain condition.

11. The system of claim 8, wherein:
when the estimated travel time is longer than a residual water drain time and shorter than a first reference time, the controller is programmed to update the estimated travel time; and
when the updated estimated travel time reaches an EV mode drivable time based on a current state of charge of a battery of the vehicle, the controller is programmed to operate the drain device in the normal drain condition during the residual water drain time.

12. The system of claim 8, wherein:
when the estimated travel time is longer than a first reference time, the controller is programmed to update the estimated travel time; and
when the updated estimated travel time reaches the first reference time, the controller is programmed to charge a battery by increasing a target state of charge of the battery.

13. The system of claim 12, wherein:
when a state of charge of the battery reaches the target state of charge, the controller is programmed to update the updated estimated travel time to a second updated estimated travel time; and
when the second updated estimated travel time reaches a second reference time shorter than the first reference time, the controller is programmed to operate the drain device in the normal drain condition during a residual water drain time.

14. The system of claim 13, wherein:
while the vehicle is operating in the EV mode after the residual water is drained from the fuel cell, the controller is programmed to calculate an estimated discharge time based on the state of charge of the battery; and when the estimated discharge time is shorter than the second updated estimated travel time, the controller is programmed to limit an output of the vehicle.

15. The system of claim 8, wherein:

when the navigation information is available but the destination of the vehicle is not the hydrogen charging station, the controller is programmed to review whether or not there is any hydrogen charging station recorded as a visited place within a reference radius of the vehicle or on a travel route leading to the destination; and when there is the hydrogen charging station recorded as the visited place, the controller is programmed to review whether or not a residual water drain preceding request is input.

16. The system of claim 15, wherein:

when the residual water drain preceding request is input, the controller is programmed to calculate the estimated travel time required to arrive at the destination; and when the estimated travel time reaches a first reference time, the controller is programmed to charge a battery by increasing a target state of charge of the battery.

17. A fuel cell vehicle, the vehicle comprising:

a fuel cell;

a drain device configured to drain residual water from the fuel cell; and a controller programmed to:

determine that a destination of the vehicle is a hydrogen charging station based on information from a navigation device;

calculate an estimated travel time required to arrive at the hydrogen charging station;

update the estimated travel time as the vehicle travels to the hydrogen charging station in response to the estimated travel time being longer than a first reference time;

charge a battery by increasing a target state of charge of the battery in response to the updated estimated travel time reaching the first reference time;

cause the residual water to be drained from the fuel cell by operating the drain device while charging the battery;

turn off the fuel cell in response to the residual water being drained from the fuel cell; and convert the vehicle into an EV mode in response to the residual water being drained from the fuel cell and the fuel cell being turned off.

18. The vehicle of claim 17, wherein the controller is further programmed to:

update the updated estimated travel time to a second updated estimated travel time in response to a state of charge of the battery reaching the target state of charge;

operate the drain device in a normal drain condition during a residual water drain time in response to the second updated estimated travel time reaching a second reference time shorter than the first reference time;

calculate an estimated discharge time based on the state of charge of the battery in response to the vehicle operating in the EV mode after the residual water is drained from the fuel cell; and limit an output of the vehicle in response to the estimated discharge time being shorter than the second updated estimated travel time.

19. A system of a fuel cell vehicle, the system comprising:

a fuel cell;

a drain device configured to drain residual water from the fuel cell; and a controller programmed to:

determine that charging the vehicle with hydrogen is necessary;

cause the residual water to be drained from the fuel cell through the drain device in response to determining that charging the vehicle with hydrogen is necessary;

turn off the fuel cell in response to the residual water being drained from the fuel cell;

convert the fuel cell vehicle into an EV mode in response to the fuel cell being turned off; and operate the vehicle in the EV mode by driving a motor using electricity stored in a battery.

20. The system of claim 19, wherein:

the drain device comprises an air compressor configured to supply air to the fuel cell; and the controller is programmed to operate the drain device in a normal drain condition or an emergency drain condition, wherein the air compressor has a greater number of revolutions or a higher supply air flow rate when operating in the emergency drain condition than in the normal drain condition.

* * * * *